Patented Apr. 21, 1925.

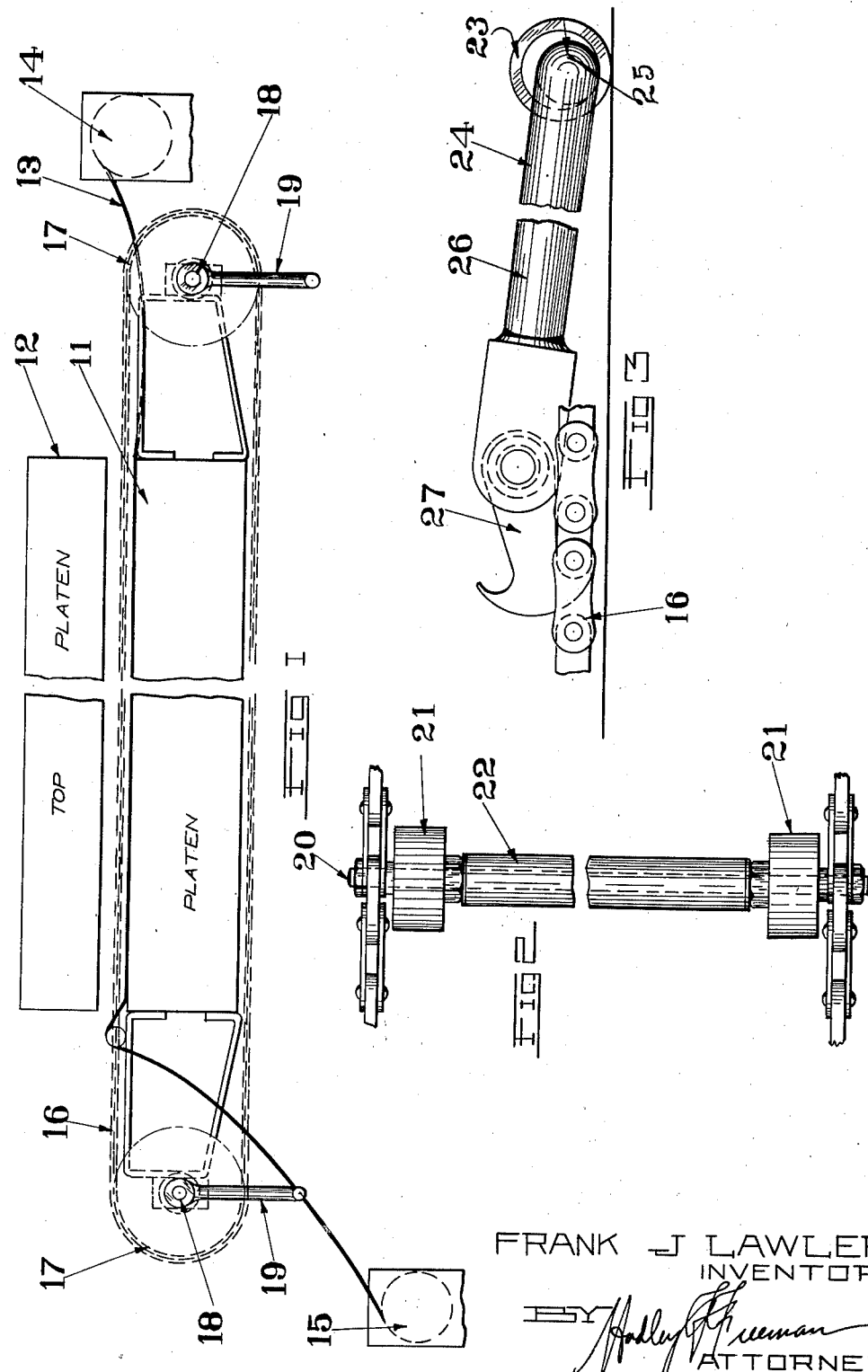

1,534,403

UNITED STATES PATENT OFFICE.

FRANK J. LAWLER, OF MILWAUKEE, WISCONSIN, ASSIGNOR, BY MESNE ASSIGN-MENTS, TO THE FISK RUBBER COMPANY, OF CHICOPEE FALLS, MASSACHUSETTS, A CORPORATION OF MASSACHUSETTS.

STRIPPING VULCANIZED MATERIAL FROM MOLDS.

Application filed October 27, 1921. Serial No. 510,926.

*To all whom it may concern:*

Be it known that I, FRANK J. LAWLER, a citizen of the United States, and a resident of Milwaukee, in the county of Milwaukee and State of Wisconsin, have invented certain new and useful Improvements in Stripping Vulcanized Material from Molds, of which the following is a specification.

My invention relates to stripping and the principal object of my invention is to provide new and improved means for stripping vulcanized material from a mold. In the drawings accompanying this specification and forming a part thereof I have shown, for purposes of illustration, one form which my invention may assume. In these drawings:

Figure 1 represents a general view of this illustrative embodiment.

Figure 2 is a detail of the stripping roller shown in Figure 1, while

Figure 3 is an alternative construction.

In the drawings my invention is disclosed as applied to a platen press shown as consisting of a lower platen 11 and a top platen 12 between which the material 13 is vulcanized. This material 13 is shown as continuous and as passing from a supply drum 14 onto a stock drum 15. It will be understood by those skilled in the art that the stock 13 is pulled forward to cover the lower platen and the top platen moved down to press the stock while the heat of the two platens is acting to vulcanize the stock, that after vulcanization the top platen is raised, and that the stock is then drawn forward to present the next section of uncured stock for the subsequent action of the vulcanizing press.

In presses of this kind various expedients have been resorted to in the attempt to properly and efficiently strip the material from the platen. The device herein shown has been found to accomplish the desired result in that it not only strips the material economically but also without injury thereto.

This device consists of a pair of chains 16 each passing about a pair of sprockets 17 which are secured to shafts 18 which in turn carry cranks 19. Mounted between the two chains 16 is a rod 20 carrying a pair of narrow rollers 21 and a stripping roller 22 both mounted loosely thereon. Between operations the roller 22 lies beneath the material as shown in Figure 1. When it is desired to strip the material the sprockets 17 are rotated by means of the cranks 19 to thus move the chain 16 and in this manner advance the rod 20. Upon this advance movement of the rod 20 the rollers 21 ride on the edge of the lower platen and thus maintain the rod and the stripping roller out of contact with the lower platen while the stripping roller rolls under the material and raises it from the platen.

By holding the stripping roller out of contact with the platen and permitting it to roll with the material I eliminate strains which might disrupt the material. Certain materials, however, are sufficiently rugged to withstand the strain and in such case I may substitute for the rollers 21 and 22 a single roller such as the roller 23 shown in the modification (Figure 3). In certain cases I may find it desirable to removably attach the stripping mechanism to the chains 16 and in such case I may substitute for the rod 20 a U-shaped member 24 provided with a cross-piece 25 equivalent to the rod 20 and with a pair of arms 26 each pivotally carrying a hook 27 by means of which the U-shaped member 24 may be hooked into the chain 16.

I have disclosed herein one embodiment of my invention and certain modifications. This disclosure, however, is illustrative only and my invention is, of course, not limited thereto.

I claim:

1. A device adapted to strip material from a mold comprising a roller and means to move said roller between the material and the surface of the mold.

2. A device adapted to strip material from a mold comprising a stripping element, means to move said element between the material and the surface of the mold and means to maintain said element out of contact with said surface.

3. A device adapted to strip material from a mold comprising a freely rotatable roller means to move said roller between the material and the surface of the mold and means to maintain said roller out of contact with said surface.

In testimony whereof I have signed my name to the above specification.

FRANK J. LAWLER.